United States Patent
Pelot

(10) Patent No.: US 10,723,408 B2
(45) Date of Patent: Jul. 28, 2020

(54) COMPRESSION SENSITIVE SUSPENSION DAMPENING

(71) Applicant: Fox Factory, Inc., Scotts Valley, CA (US)

(72) Inventor: Sante Pelot, Freedom, CA (US)

(73) Assignee: Fox Factory, Inc., Braselton, GA (US)

( * ) Notice: Subject to any disclaimer, the term of this patent is extended or adjusted under 35 U.S.C. 154(b) by 270 days.

(21) Appl. No.: 15/393,939

(22) Filed: Dec. 29, 2016

(65) Prior Publication Data

US 2017/0106938 A1    Apr. 20, 2017

Related U.S. Application Data

(63) Continuation of application No. 14/981,274, filed on Dec. 28, 2015, now Pat. No. 9,533,732, which is a continuation of application No. 14/270,273, filed on May 5, 2014, now Pat. No. 9,254,887, which is a continuation of application No. 13/404,916, filed on Feb. 24, 2012, now Pat. No. 8,800,973.

(60) Provisional application No. 61/446,927, filed on Feb. 25, 2011.

(51) Int. Cl.

| B62K 25/08 | (2006.01) |
| F16F 9/06 | (2006.01) |
| F16F 9/512 | (2006.01) |
| B60G 11/27 | (2006.01) |
| B60G 15/12 | (2006.01) |
| F16F 9/02 | (2006.01) |
| B60G 15/06 | (2006.01) |
| F16F 9/50 | (2006.01) |

(52) U.S. Cl.
CPC ............. *B62K 25/08* (2013.01); *B60G 11/27* (2013.01); *B60G 15/12* (2013.01); *F16F 9/0209* (2013.01); *F16F 9/06* (2013.01); *F16F 9/062* (2013.01); *F16F 9/512* (2013.01); *B60G 15/06* (2013.01); *B60G 2202/32* (2013.01); *B60G 2300/12* (2013.01); *B62K 2201/04* (2013.01); *B62K 2201/08* (2013.01); *F16F 9/50* (2013.01)

(58) Field of Classification Search
CPC .............. B62K 25/08; B62K 2201/04; B62K 2201/08; B60G 2202/32; B60G 15/06; B60G 15/12; B60G 2300/12; F16F 9/0209; F16F 9/50; F16F 9/062; F16F 9/18
USPC ...................................... 267/64.26
See application file for complete search history.

(56) References Cited

U.S. PATENT DOCUMENTS

| 4,971,344 A | 11/1990 | Turner | |
| 5,449,188 A * | 9/1995 | Ohma | B62K 25/08 188/282.6 |
| 6,260,832 B1 * | 7/2001 | Vignocchi | B60G 15/061 188/282.5 |
| 6,328,291 B1 | 12/2001 | Marzocchi et al. | |
| 6,343,807 B1 * | 2/2002 | Rathbun | B62K 25/08 267/175 |
| 6,568,664 B2 | 5/2003 | Furuya | |

(Continued)

*Primary Examiner* — Thomas W Irwin

(57) ABSTRACT

A spring for a suspension is described. The spring includes: a spring chamber divided into at least a primary portion and a secondary portion, and a fluid flow path coupled with and between the primary portion and the secondary portion. The fluid flow path includes a bypass mechanism, wherein the bypass mechanism is configured for automatically providing resistance within the fluid flow path in response to a compressed condition of the suspension.

20 Claims, 6 Drawing Sheets

(56) References Cited

U.S. PATENT DOCUMENTS

| | | | |
|---|---|---|---|
| 6,607,185 B2* | 8/2003 | Graves | B62K 25/08 188/24.11 |
| 7,195,234 B2* | 3/2007 | Jordan | B62K 25/08 267/64.11 |
| 7,296,812 B2 | 11/2007 | Fujita et al. | |
| 7,357,232 B2* | 4/2008 | Fujita | B60G 15/061 188/297 |
| 7,364,143 B2 | 4/2008 | Chen | |
| 7,891,645 B2* | 2/2011 | Schroeder | B62K 25/08 267/178 |
| 8,167,328 B2* | 5/2012 | Powell | B62K 25/08 280/279 |
| 8,511,448 B2 | 8/2013 | Gonzalez et al. | |
| 8,672,106 B2* | 3/2014 | Laird | B62K 25/08 188/275 |
| 8,800,973 B2 | 8/2014 | Pelot et al. | |
| 9,254,887 B2 | 2/2016 | Pelot | |
| 9,533,732 B2* | 1/2017 | Pelot | F16F 9/06 |
| 10,180,171 B2* | 1/2019 | Laird | B62K 25/08 |
| 10,330,171 B2* | 6/2019 | Cox | F16F 9/48 |
| 2010/0225081 A1* | 9/2010 | Galasso | B62K 25/08 280/124.1 |
| 2010/0314209 A1* | 12/2010 | Gonzalez | B62K 25/08 188/297 |
| 2011/0062679 A1* | 3/2011 | Shirai | B62K 25/08 280/276 |
| 2011/0083930 A1* | 4/2011 | Laird | B62K 25/08 188/275 |
| 2011/0187076 A1* | 8/2011 | Gonzalez | B62K 25/04 280/276 |
| 2019/0145483 A1* | 5/2019 | Laird | B62K 25/08 |

* cited by examiner

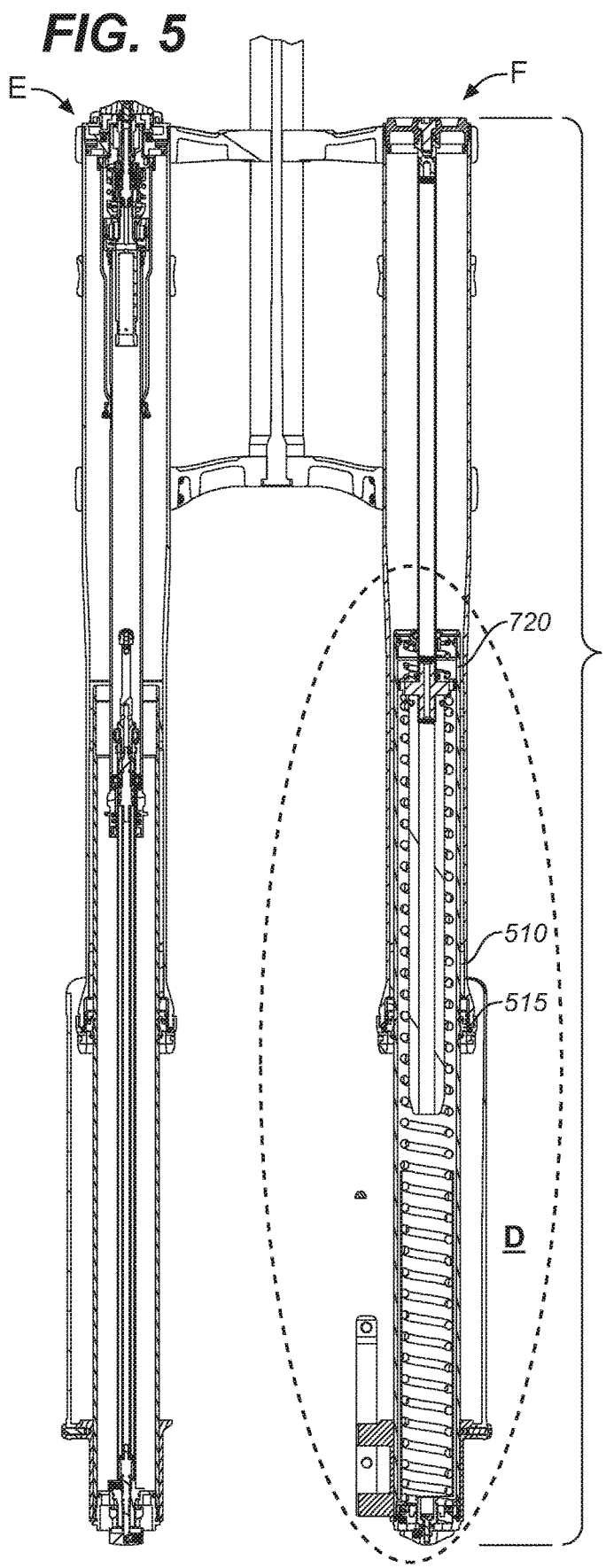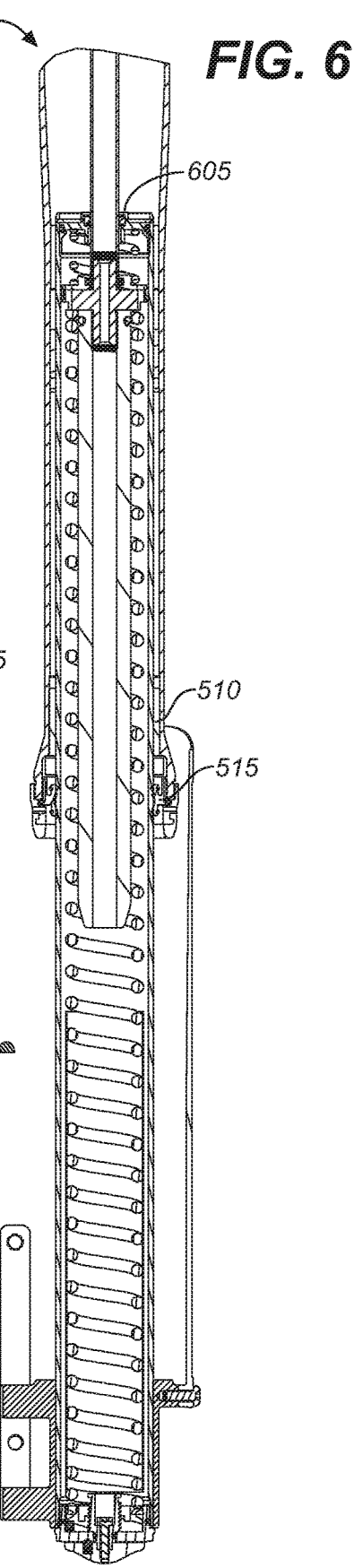

COMPRESSION SENSITIVE SUSPENSION DAMPENING

CROSS-REFERENCE TO RELATED APPLICATIONS

This application is a continuation application of and claims priority to and benefit of U.S. patent application Ser. No. 14/981,274 filed on Dec. 28, 2015 now U.S. Pat. No. 9,533,732 entitled "COMPRESSION SENSITIVE SUSPENSION DAMPENING" by Sante Pelot, assigned to the assignee of the present application, and incorporated herein, in its entirety, by reference.

The application Ser. No. 14/981,274 is a continuation application of and claims priority to and benefit of U.S. patent application Ser. No. 14/270,273, filed on May 5, 2014, now U.S. Pat. No. 9,254,887 entitled "COMPRESSION SENSITIVE SUSPENSION DAMPENING" by Sante Pelot, assigned to the assignee of the present application, and incorporated herein, in its entirety, by reference.

The application Ser. No. 14/270,273 is a continuation application of and claims priority to and benefit of U.S. patent application Ser. No. 13/404,916 filed on Feb. 24, 2012, now U.S. Pat. No. 8,800,973, entitled "COMPRESSION SENSITIVE SUSPENSION DAMPENING" by Sante Pelot, assigned to the assignee of the present application, and incorporated herein, in its entirety, by reference.

The application Ser. No. 13/404,916 claims priority to and benefit of U.S. provisional patent application 61/446,927, filed Feb. 25, 2011 entitled "METHODS AND APPARATUS FOR COMPRESSION SENSITIVE SUSPENSION DAMPENING", by Sante Pelot, assigned to the assignee of the present application, and is incorporated herein, in its entirety, by reference.

FIELD OF THE INVENTION

Embodiments generally relate to methods and apparatus for use in vehicle suspension. Particular embodiments relate to methods and apparatus useful for variable and position sensitive dampening rate in vehicle shock absorbers. More particular embodiments relate to methods and apparatus useful for variable and position sensitive dampening rate in vehicle front forks.

BACKGROUND

Vehicle suspension systems typically include a spring component or components and a dampening component or components. Typically, mechanical springs, such as helical springs are used with some type of viscous fluid-based dampening mechanism and the two are mounted functionally in parallel. In its basic form, the damper controls the speed of movement, such as telescopic compression, of the suspension by metering substantially incompressible fluid from one side of a piston to the other, and/or from a main chamber to a reservoir, during a compression stroke.

While various refinements have been made to shock absorbers to enhance their performance, one continuing problem is that of a "bottom out" condition due to high compressive forces brought about by terrain and the weight of a rider. What is needed is a bottom out buffering system that provides a complete and user-adjustable secondary cushion arrangement.

BRIEF DESCRIPTION OF THE DRAWINGS

FIG. 5 illustrates an "asymmetric" inverted bicycle fork having a damping leg and a spring leg, in accordance with an embodiment.

FIG. 6 is an enlarged view of a structure of the spring leg illustrated in FIG. 5, in accordance with an embodiment.

The drawings referred to in this description should not be understood as being drawn to scale unless specifically noted.

DESCRIPTION OF EMBODIMENTS

Reference will now be made in detail to embodiments, examples of which are illustrated in the accompanying drawings. While the technology will be described in conjunction with various embodiment(s), it will be understood that they are not intended to be limited to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiments. However, embodiments may be practiced without these specific details. In other instances, well known methods, procedures, components, and circuits have not been described in detail as not to unnecessarily obscure aspects of embodiments.

The discussion that follows will describe the structure and functionality of embodiments.

Figure 1:
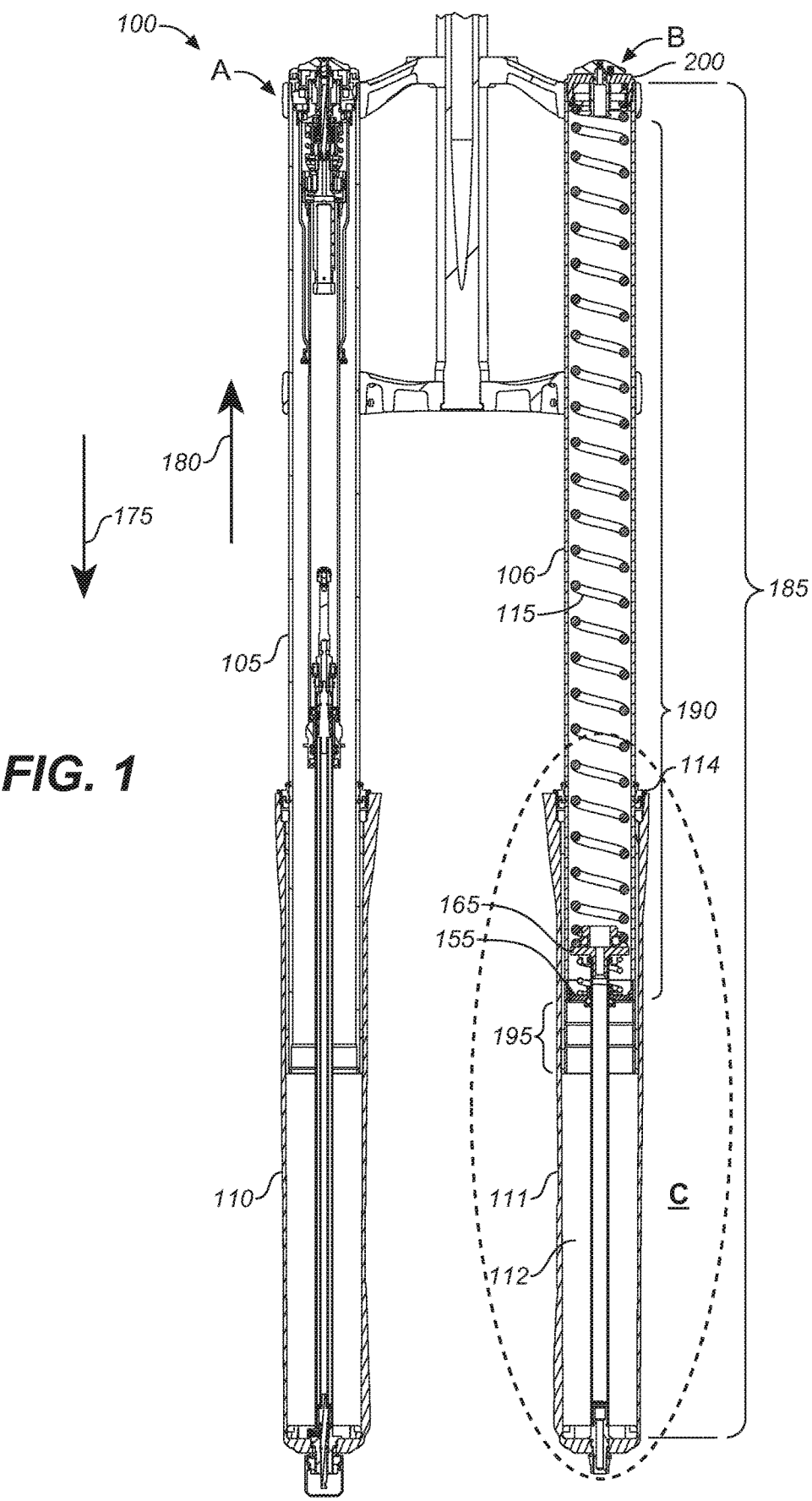
FIG. 1 illustrates an "asymmetric" bicycle fork having a damping leg and a spring leg, in accordance with an embodiment.

FIG. 1 shows an "asymmetric" bicycle fork 100 having a damping leg A and a spring leg B. The damping leg A includes an upper leg tube 105 mounted in telescopic engagement with a lower leg tube 110 and having fluid damping components therein. The spring leg B includes an upper leg tube 106 mounted in telescopic engagement with a lower leg tube 111 and having spring components therein. In one embodiment, the spring leg B includes a spring chamber 185. The spring chamber 185 is divided into a primary portion 190 and a secondary portion 195. In one embodiment, the primary portion 190 includes at least a portion of the upper leg tube 106 and the secondary portion 195 includes at least a portion of the lower leg tube 111. The lower leg tube 111 includes the air spring chamber 112, as shown. Further, a seal 114 is positioned at the upper end of the lower leg tube 111 and between the outer surface of the lower leg tube 111 and the upper leg tube 106. The seal 114 assists in defining the volume of fluid in the oil bath chamber 125.

Figure 2:
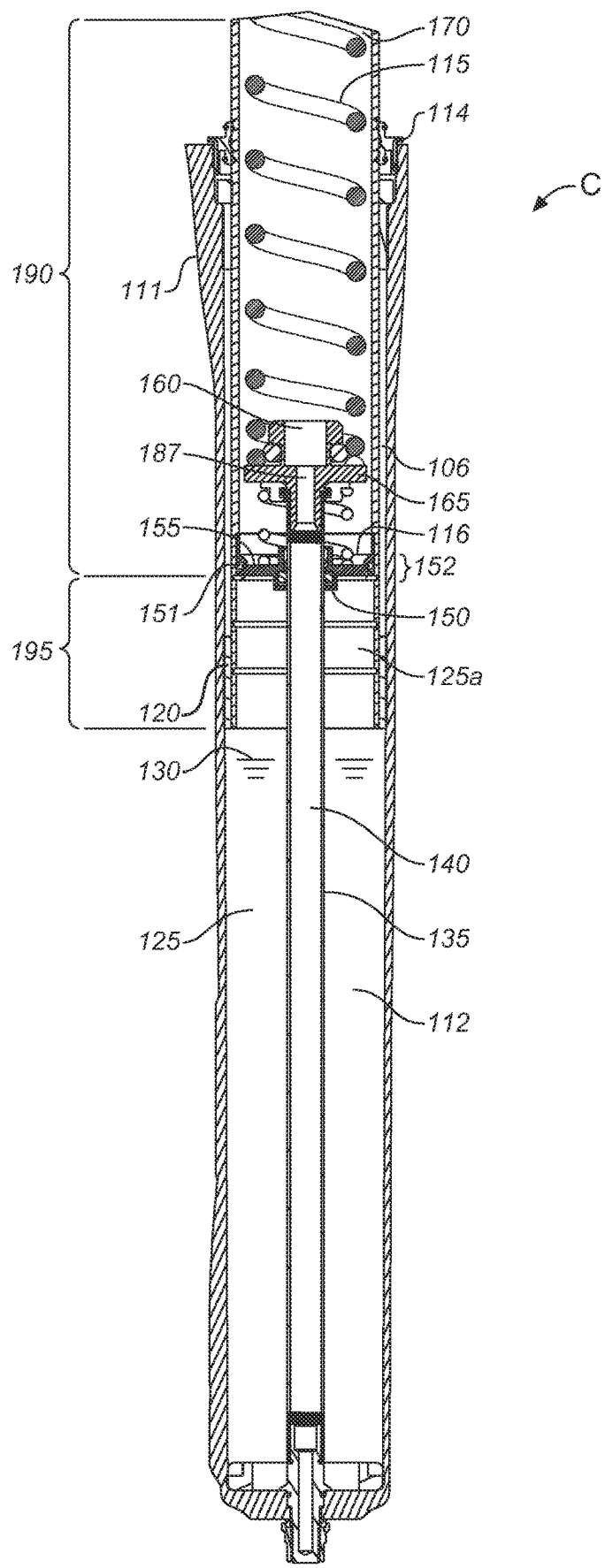
FIG. 2 is an enlarged view of a structure of the spring leg illustrated in FIG. 1, in accordance with an embodiment.

FIG. 2 is an enlarged view of a structure of the spring leg B illustrated in FIG. 1, according to an embodiment. With reference to FIGS. 1 and 2, in one embodiment, the spring components of spring leg B include a helically wound spring 115 and the structure of portion "C" as shown further in FIG. 2. The helically wound spring 115 is contained within the upper leg tube 106 and axially restrained between the top cap 200 and the flange 165. The flange 165 is disposed at an upper end of the riser tube 135 and fixed thereto. The lower end of the riser tube 135 is connected to the lower leg tube 111 and fixed relative thereto.

A fluid flow path 160 includes a bypass mechanism that automatically provides resistance within the fluid flow path 160 in response to a compressed condition of the suspension. In one embodiment, the bypass mechanism is a valve 152. The valve 152, in one embodiment, includes a valve plate 155. The valve plate 155 is positioned within the upper leg tube 106 and axially fixed thereto such that the plate 155 moves with the upper tube 106. The valve plate 155 is annular in configuration, surrounds the exterior surface of the riser tube 135 and is axially slidable in relation thereto. The valve 152 includes an outer seal 151 on an outer surface where such outer seal 151 seals between an interior surface of the upper leg tube 106 and an exterior surface of the valve plate 155, thereby isolating spring chamber 170 from oil bath chamber 125. The valve plate 155 further includes an inner seal 150 about an interior surface thereof, where such inner seal 150 dynamically seals between the interior surface of the valve plate 155 and an exterior surface of the riser tube 135.

Of note, while the bypass mechanism is shown as a valve 152 in one embodiment, it should be appreciated that any type of mechanism that causes resistance to the flow of fluid within the fluid flow path 160 may be used. For example, but not limited to such example, a narrowing beveled portion of the fluid flow path 160 could function as a bypass mechanism. For example, the narrowed beveled portion of the fluid flow path 160 may be smaller in diameter than that of the piston 187 moving there through. Thus, the piston 187, upon interaction with the narrowed beveled portion of the fluid flow path 160 will at least slow due to an interference fitting, if not stop completely. This will result in a buffering of the bottom out effect. FIG. 2 also shows a seal 114, which also assists in defining the volume 125 of fluid in the oil bath chamber 125.

Figure 4:
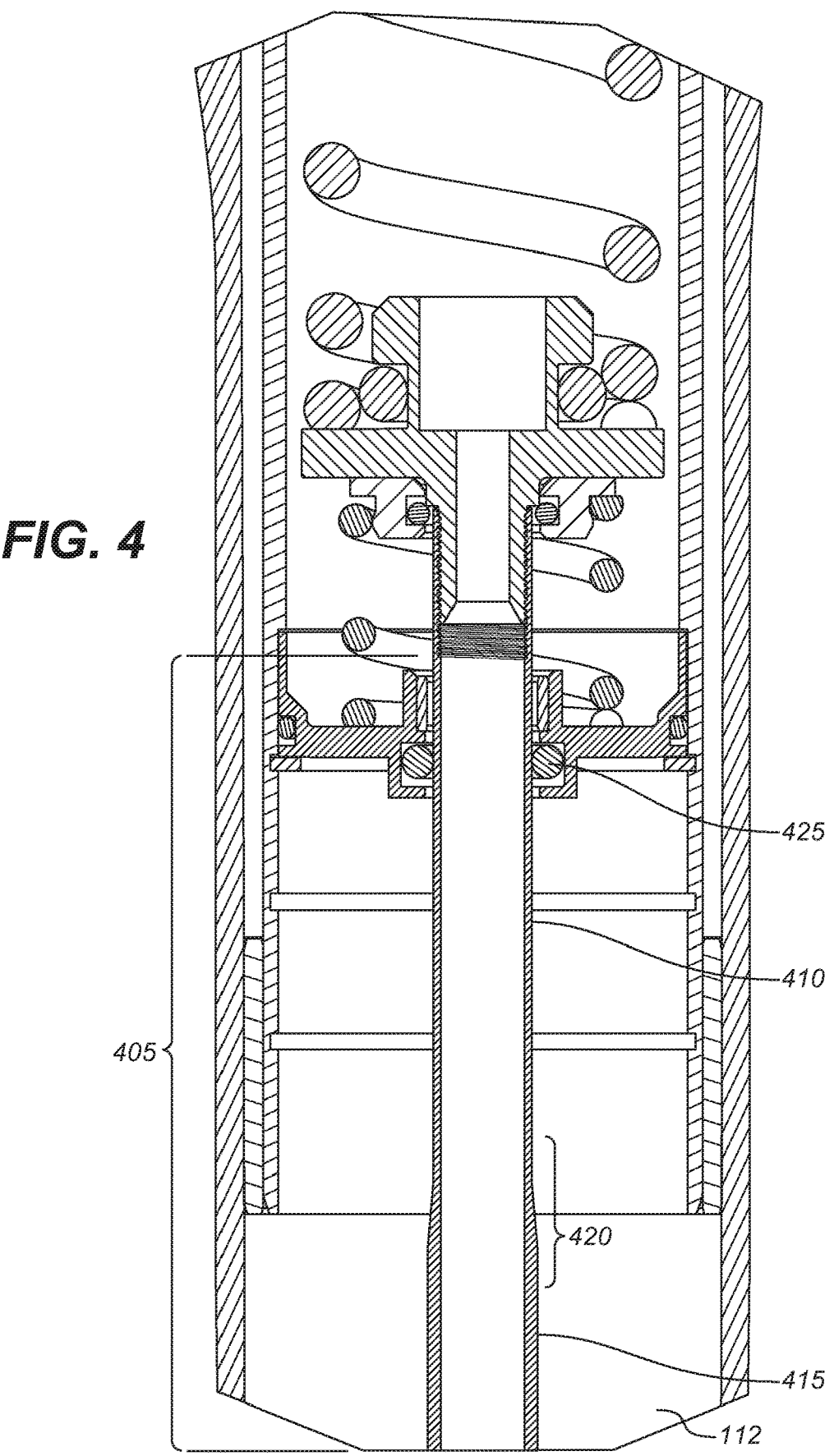
FIG. 4 is an enlarged view of a structure of the spring leg illustrated in FIG. 1, in accordance with an embodiment.

In yet another embodiment, FIG. 4 illustrates an enlarged view of the structure C of FIG. 1, in accordance with an embodiment. With reference now to FIGS. 1, 2 and 4, in one embodiment, the bypass mechanism is a tapered outer diameter 405 on the riser tube 135. The tapered outer diameter 405 is configured for providing resistance to a compressing movement of said suspension. For example, as the valve 152 is pushed downwards towards the tapered outer diameter 405 of the riser tube 135, over the narrowed section 410 and onto the widened section 415, a dynamic seal 425 of the valve 152 engages with the widened section 415 of the outer diameter, at about, but not limited to, area 420. The valve 152, therefore, encounters resistance through the sealing of the lower air spring chamber 112. The volume of fluid within oil bath chamber 125 is reduced when the dynamic seal 425 engages the widened section 415 of the riser tube 135 at area 420. It should be appreciated that the dynamic seal 425 is coupled with the valve 152 and is the closest component of the valve 152 to the outer surface of the riser tube 135.

Of note, the use of the tapered outer diameter 405 avoids the dynamic seal friction occurring at the top of a stroke, as compared to the embodiment with the at least one aperture 145 (as will be discussed herein). Essentially, the use of the tapered outer diameter 405 of the riser tube 135 enables the benefits of a coil (low friction) and an air spring (progressivity) to both be realized.

In one embodiment, a spring for a suspension includes the spring chamber 170 and a fluid flow path 160 coupled with and between the primary portion 190 and the secondary portion 195.

Figure 3:
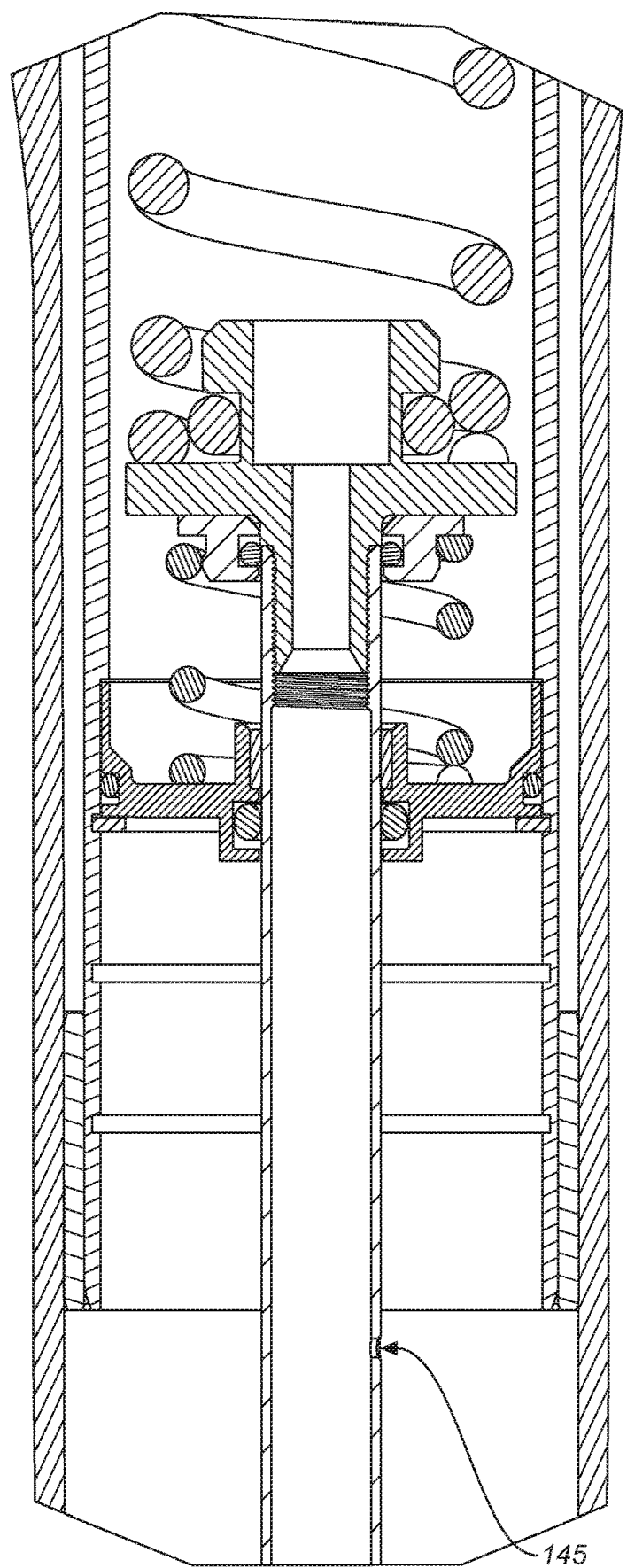
FIG. 3 is an enlarged view of a structure of the spring leg illustrated in FIG. 1, in accordance with an embodiment.

In one embodiment, an oil bath chamber 125 of the spring leg B contains a substantially incompressible lubricant (e.g. oil) having an upper surface level 130. Spring chamber 170, fluid flow path 160 and an upper portion 125a of oil bath chamber 125 contain a compressible fluid such as, for example, atmospheric air (with the fork in a fully extended state). FIG. 3 illustrates an enlarged view of a structure of the spring leg illustrated in FIG. 1, in accordance with an embodiment. With reference now to FIGS. 1-3, the riser tube 135 includes at least one aperture 145 through a wall thereof that communicates an exterior (e.g. upper portion 125a) of the riser tube 135 with an interior 140 of the riser tube 135. In one embodiment, an interior 140 of the riser tube 135 contains, at least in part, a compressible fluid (e.g. gas, air). In one embodiment, the upper leg tube 106 is held centralized within the lower leg tube 111 by an annular bushing 120.

Reference directions "down" 175 and "up" 180 are shown in FIG. 1. In operation, the lower leg tube 111 moves up relative to the upper leg tube 106 (and/or the upper leg tube 106 moves down relative to the lower leg tube 111) when an obstruction is encountered by a vehicle equipped with the symmetric bicycle fork 100. During such compression, the upper leg tube 106 is extended telescopically further into the lower leg tube 111 and the helically wound spring 115 is compressed axially between the top cap 200 (fixed to the upper leg tube 106) and the flange 165 (fixed to the lower leg tube 111 via the riser tube 135). In addition to the helically wound spring 115, gas within the spring leg B is compressed as the interior volume (formed by the combined interiors of the upper leg tube 106 and the lower leg tube 111) decreases with compression. In one embodiment, the gas within the interior of the spring chamber 170, fluid flow path 160, and the upper portion 125a of the oil bath chamber 125 is initially atmospheric air and the volumes of the spring chamber 170 and the fluid flow path 160 are in fluid communication with the volume of the upper portion 125a of the oil bath chamber 125 via the at least one aperture 145 so that compression of the atmospheric air has little spring effect.

In one embodiment, the valve plate 155 moves downward, with the upper leg tube 106 and relative to an exterior of the riser tube 135 and hence the at least one aperture 145. Based on the design position of the at least one aperture 145 and the other design factors, the valve plate 155 passes downward over the at least one aperture 145 at some compressive state of the spring leg B prior to complete bottom out ("bottom out" refers to a point of maximum practical leg compression). When the valve plate 155 and the inner seal 150 pass downward over the at least one aperture 145, the fluid communication between the spring chamber 170 and the fluid flow path 160 and the upper portion 125a of the oil bath chamber 125 is closed. Further movement downward (relative to the lower leg tube 111 and the riser tube 135) of the valve plate 155 and the upper leg tube 106 acts to further compress a relatively small volume of gas contained in the upper portion 125a of the oil bath chamber 125. Because the volume in the upper portion 125a of the oil bath chamber 125 is small, further compression of that upper portion 125a of the oil bath chamber 125 results in the rapid build-up of pressure within the upper portion 125a of the oil bath chamber 125 which acts axially over the piston area of the valve plate 155 and greatly augments the spring force in the spring leg B previously (i.e., before closure of the at least one aperture 145) supplied only by the helically wound spring 115. In one embodiment, the upper surface level 130 of the oil in the oil bath chamber 125 may be adjusted upwardly or downwardly to increase or decrease, respectively, a pressure rise rate of the upper portion 125a of the oil bath chamber 125 following the closure of the at least one aperture 145. Additionally, the system may be pressurized from the top cap 200 or the base stud. For example, the upper portion 125a (e.g., air chamber) of the oil bath chamber 125 may be pressurized, in order to assist in the resistance to the compressive forces. It should be appreciated that various embodiments may not include the at least one aperture 145.

Of note, in one embodiment and as discussed herein, the valve 152 includes an inner seal 50 disposed on an interior surface of the valve plate 155. The inner seal 50 dynamically seals between the interior surface of the valve plate 155 and an exterior surface of the riser tube 135. By "dynamically", it is meant that the inner seal 50 accomplishes the sealing during the process movement of the valve. Further, in one embodiment and as discussed herein, the valve 152 includes an outer seal 51 disposed on an outer surface of the valve plate 155. The outer seal 51 seals between an interior surface of the primary portion 190 and the outer surface of the valve plate 155 such that the primary portion 190 is isolated from the oil bath chamber 125. The oil bath chamber 125 is positioned below the primary portion 190. As discussed herein, the oil bath chamber 125 is configured to hold a fluid.

In practice, one embodiment of the spring leg B of the symmetric bicycle fork 100 exhibits a smooth and predictable compression spring rate based on a helically wound spring 115 until and/or unless a large compressive force is encountered. If such force is imparted to the fork, the symmetric bicycle fork 100 will compress predictably until near (as near as desired based on design and fluid level selection) bottom out at which point the effective spring rate of the symmetric bicycle fork 100 will increase rapidly due to the added relatively small volume and high spring rate of the gas spring. Such a rapid late compression increase will help the symmetric bicycle fork 100 avoid bottom out and its associated jarring effects on the vehicle and the operator.

Figure 7:
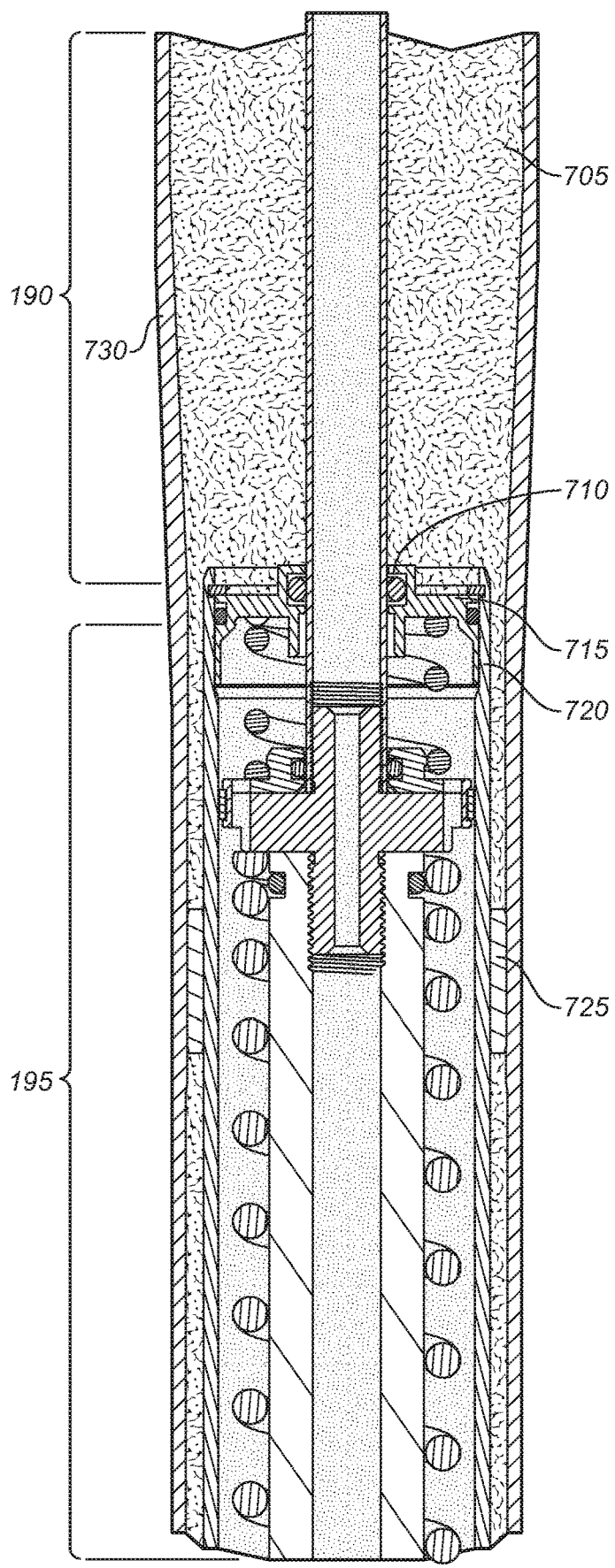
FIG. 7 is an enlarged view of a structure of the spring leg illustrated in FIG. 5, in accordance with an embodiment.

FIG. 5 illustrates an "asymmetric" inverted bicycle fork having a damping leg E and a spring leg F, in accordance with an embodiment. Also of note, FIG. 5 illustrates a spring chamber 505 within the spring leg F. The spring chamber 505 includes a lower bushing 510 and a seal 515 within the spring chamber 505. The seals 515 and 605 (of FIG. 6) assist in defining the volume of fluid in the oil bath chamber 705 (of FIG. 7). FIG. 6 illustrates an enlarged view of a structure D of the spring leg F illustrated in FIG. 5, in accordance with an embodiment. FIG. 7 illustrates an enlarged view of the structure D of the spring leg F illustrated in FIGS. 5 and 6, in accordance with an embodiment.

With reference now to FIGS. 1-7, in one embodiment, the spring includes a spring chamber 505 divided into at least the primary portion 190 and the secondary portion 195. The spring further includes a combination of a compressible fluid and an incompressible fluid. This combination is configured for automatically providing resistance in response to a compressed condition of the suspension. For example, but not limited to such example, in general terms, the combination provides resistance to the movement of the upper and lower leg tubes relative to each other, thereby reducing and/or avoiding the bottom out effect.

As illustrated in FIG. 7 and denoted in regions containing squiggle lines, in one embodiment the primary portion 190 contains at least a volume of one or more fluids. Moreover, as denoted in regions containing dots, in one embodiment the secondary portion 195 contains at least a volume of one or more fluids. As further illustrated in FIG. 7, the spring chamber 505 includes an oil bath chamber 705 containing a volume of compressible and incompressible fluid, a dynamic seal 710, a piston 715, a slider 720, and an upper bushing 725. Of note, there is no fluid flow path between the primary portion 190 and the secondary portion 195. The dynamic seal 710 is always engaged at any position within the fork's travel, such that a resistance is always provided to reduce and/or avoid the bottom out effect. In other words, the primary portion 190 and the secondary portion 195 are sealed from each other 100% of the time. The resistance to the bottom out effect results at least partially from the compression of the compressible fluid volume with the oil bath chamber 705 during the fork's travel.

The slider 720 functions, at least in part, analogously to the upper leg tube 106 shown in FIGS. 1-4. The slider 720 "slides" within the upper leg tube 730. In general terms, the movement of the slider 720 into the upper leg tube 730 causes the compressible fluid within the oil bath chamber 705 to become compressed, and forces the oil (incompressible fluid) from the oil bath chamber 705 to travel around the secondary chamber 195 to the upper and lower bushings, 725 and 510 (shown in FIG. 5 and not shown in enlarged FIG. 7), respectively. (Of note, the upper and lower bushings, 725 and 510, respectively, are slotted so that they permit fluid to bypass them.) Thus, upon compression, the upper and lower bushings, 725 and 510, respectively, automatically receive lubrication via an oil bath. In this manner, the embodiments shown in FIGS. 5-7 enable a reduced volume of oil to be used within a vehicle compared to conventional designs, while enabling a more efficient lubrication method and a lighter vehicle design.

Thus, the combination of the compressible and incompressible fluids provides a resistance to the movement of at least the piston 715, thereby avoiding or mitigating the bottom out effect. Of note, the embodiments shown in FIGS. 5-7 may be used in a motorcycle. This embodiment may reduce the overall expected weight of the motorcycle by reducing the overall oil needed (as well as forcing the oil into a bushing area where it is needed for lubrication). However, it should be appreciated that embodiments shown in FIGS. 1-4 also may be integrated with the embodiments shown in FIGS. 5-7.

With reference again to FIGS. 1 and 2, in one embodiment, a vehicle suspension includes: a gas chamber having a first portion 190 and a second portion 195; a gas flow by-pass, having an open condition allowing a gas flow between the first portion and the second portion, and having a closed condition substantially denying the gas flow; and a first telescopic member and a second telescopic member (e.g., upper leg tube and/or lower leg tube, 106 and 111, respectively) being slidably engaged and having a relatively extended position wherein the gas flow by-pass is in the open condition, and a relatively compressed position wherein the gas flow by-pass is in the closed condition.

In operation, in one embodiment, the suspension is compressed to a predetermined location. A substantially sealed relationship between a primary portion of a spring chamber and a secondary portion of the spring chamber is created. A spring rate of the suspension is changed in response to the creation of the substantially sealed relationship.

In one embodiment, an upper surface level of oil in the oil bath chamber disposed within the secondary portion is adjusted upwardly to increase a pressure rise rate of the spring chamber following the creation of the substantially sealed relationship. In another embodiment, the upper surface level of oil in the oil bath chamber disposed within the secondary portion is adjusted downwardly to decrease a pressure rise rate of the spring chamber following the creating of the substantially sealed relationship.

In one embodiment, the compressing of the suspension to a predetermined location includes: extending the primary portion telescopically further into the secondary portion, wherein the primary portion is at least partially and telescopically positioned within the secondary portion; compressing a helically wound spring between a top cap that is coupled with the primary portion and a flange that is coupled with the secondary portion; and decreasing an interior volume of combined interiors of the primary portion and the secondary portion as the helically wound spring is compressed, wherein a gas within the spring chamber is compressed concurrently with the decreasing of the interior volume.

In one embodiment, the creating of a substantially sealed relationship includes: automatically closing a valve of a fluid flow path in response to a compressed condition of the suspension to create the substantially sealed relationship, wherein the fluid flow path is coupled with and between the primary portion and the secondary portion. In one embodiment, the automatically closing the valve of the fluid flow path includes: moving a valve plate of the valve downward with a movement of the primary portion, the valve plate being coupled with the primary portion, being annular, and surrounding an exterior surface of a riser tube and is axially slidable in relation to the riser tube, wherein the moving the valve plate downward is relative to the exterior of a riser tube, wherein the riser tube is disposed within and between the primary portion and the secondary portion, contains a compressible fluid and at least one aperture, the at least one aperture being configured for enabling fluid communication between the exterior and an interior of the riser tube. In one embodiment, the automatically closing of the valve of the fluid flow path further includes: moving the valve plate downwards with the movement of the primary portion to cover the at least one aperture such that the sealed relationship is formed and a fluid communication between an interior and an exterior of the riser tube is closed. In one embodiment, the moving of the valve plate downwards with the movement of the primary portion to cover the at least one aperture includes: moving the valve plate downwards to cover the at least one aperture such that the sealed relationship is formed prior to a bottoming out. In one embodiment, the primary portion and the valve plate is moved telescopically further downward to further compress a relatively small volume of gas contained in an upper portion of an oil bath chamber, such that a rapid build-up of pressure within the upper portion of the oil bath chamber occurs which acts axially over a piston area of the valve plate and augments a spring force in a spring in the spring chamber.

In one embodiment, the moving of the valve plate downwards includes: sealing, by an outer seal disposed on an outer surface of the valve plate, such that the primary portion is isolated from an oil bath chamber that is positioned below and coupled with the primary portion, wherein the oil bath chamber is configured for holding fluid. In another embodiment, the moving of the valve plate downwards includes: dynamically sealing, by an inner seal disposed on an interior surface of the valve plate, between an interior surface of the valve plate and an exterior surface of the riser tube.

In operation, in another embodiment, a method for operating a suspension, includes: compressing said suspension; receiving said compressing by a combination of a compressible fluid and an incompressible fluid; and automatically providing resistance by said combination in response to a compressed condition of said suspension.

Thus, embodiments provide a gas/spring cushion that mitigates the "bottom-out" effect.

While the foregoing is directed to certain embodiments, other and further embodiments may be implemented without departing from the scope of the present technology, and the scope thereof is determined by the claims that follow.

What I claim is:

1. A component for a vehicle suspension, said component comprising:
   an upper leg tube;
   a lower leg tube telescopically coupled to said upper leg tube;
   a spring disposed in at least one of said upper leg tube and said lower leg tube and configured to provide a spring force which resists telescopic compression of said upper leg tube and said lower leg tube; and
   a gas spring disposed in at least one of said upper leg tube and said lower leg tube, said gas spring comprising:
      a first portion;
      a second portion; and
      a gas flow by-pass coupled to said first portion and said second portion, said gas flow by-pass comprising:
         an open position wherein gas flow between said first portion and said second portion is allowed and a first gas spring force resisting movement of said upper leg tube and said lower leg tube with respect to each other is provided, said gas flow by-pass having said open position when said upper leg tube and said lower leg tube are telescopically compressed, with respect to each other, to a first position; and
         a closed position wherein gas flow between said first portion and said second portion is substantially denied and a second gas spring force resisting movement of said upper leg tube and said lower leg tube with respect to each other is provided, said second gas spring force greater than said first gas spring force, said gas flow by-pass having said closed position when said upper leg tube and said lower leg tube are telescopically compressed, with respect to each other, to a second position, said second position comprising a greater amount of telescopic compression between said upper leg tube and said lower leg tube than occurs at said first position.

2. The component of claim 1 wherein said gas spring further comprises:
   a first volume of compressible fluid when said upper leg tube and said lower leg tube are telescopically compressed to said first position; and
   a second volume of compressible fluid when said upper leg tube and said lower leg tube are telescopically compressed to said second position.

3. The component of claim 2 wherein said gas spring has said first volume of compressible fluid when said upper leg tube and said lower leg tube are not telescopically compressed toward a bottom out position.

4. The component of claim 2 wherein said gas spring has said second volume of compressible fluid when said upper leg tube and said lower leg tube are telescopically compressed toward a bottom out position.

5. The component of claim 1 wherein a pressure within said gas spring is adjustable.

6. The component of claim 5 wherein said pressure within said gas spring is adjusted using a top cap coupled to said component.

7. The component of claim 5 wherein said pressure within said gas spring is adjusted using a base stud coupled to said component.

8. The component of claim 1 wherein a volume of said gas spring is adjustable.

9. The component of claim 8 wherein said volume of said gas spring is adjusted by varying an amount of incompressible fluid disposed within said component.

10. The component of claim 1 wherein said gas spring is configured to rapidly increase said second gas spring force when said upper leg tube and said lower leg tube are telescopically compressed toward a bottom out position.

11. The component of claim 1 wherein a volume of said gas spring is adjustable.

12. The component of claim 11 wherein said volume of said gas spring is adjusted by varying an amount of incompressible fluid disposed within said component.

13. A component for a vehicle suspension, said component comprising:
    an upper leg tube;
    a lower leg tube telescopically coupled to said upper leg tube;
    a spring disposed in at least one of said upper leg tube and said lower leg tube and configured to provide a spring force which resists telescopic compression of said upper leg tube and said lower leg tube; and
    a gas spring comprising:
        a first portion;
        a second portion; and
        a gas flow by-pass coupled to said first portion and said second portion, said gas flow by-pass comprising:
            an open position wherein gas flow between said first portion and said second portion is allowed and a first gas spring force resisting movement of said upper leg tube and said lower leg tube with respect to each other is provided, said gas flow by-pass having said open position when said upper leg tube and said lower leg tube are telescopically compressed, with respect to each other, to a first position; and
            a closed position wherein gas flow between said first portion and said second portion is substantially denied and a second gas spring force resisting movement of said upper leg tube and said lower leg tube with respect to each other is provided, said second gas spring force greater than said first gas spring force, said gas flow by-pass having said closed position when said upper leg tube and said lower leg tube are telescopically compressed, with respect to each other, to a second position, said second position comprising a greater amount of telescopic compression between said upper leg tube and said lower leg tube than occurs at said first position.

14. The component of claim 13 wherein said gas spring further comprises:
    a first volume of compressible fluid when said upper leg tube and said lower leg tube are telescopically compressed to said first position; and
    a second volume of compressible fluid when said upper leg tube and said lower leg tube are telescopically compressed toward a bottom out position.

15. The component of claim 14 wherein said gas spring has said first volume of compressible fluid when said upper leg tube and said lower leg tube are not telescopically compressed toward said bottom out position.

16. The component of claim 14 wherein said gas spring has said second volume of compressible fluid when said upper leg tube and said lower leg tube are telescopically compressed toward said bottom out position.

17. The component of claim 13 wherein a pressure within said gas spring is adjustable.

18. The component of claim 17 wherein said pressure within said gas spring is adjusted using a top cap coupled to said component.

19. The component of claim 17 wherein said pressure within said gas spring is adjusted using a base stud coupled to said component.

20. The component of claim 13 wherein said gas spring is configured to rapidly increase said second gas spring force when said upper leg tube and said lower leg tube are telescopically compressed toward said bottom out.

\* \* \* \* \*